United States Patent [19]
Pratt et al.

[11] Patent Number: 4,732,818
[45] Date of Patent: Mar. 22, 1988

[54] COMPOSITE BEARING MATERIAL WITH POLYMER FILLED METAL MATRIX INTERLAYER OF DISTINCT METAL PARTICLE SIZES AND METHOD OF MAKING SAME

[75] Inventors: George C. Pratt, Ann Arbor; Michael C. Montpetit, Chelsea; Michael D. Lytwynec, Brighton, all of Mich.

[73] Assignee: Federal-Mogul Corporation, Southfield, Mich.

[21] Appl. No.: 913,610

[22] Filed: Sep. 29, 1986

Related U.S. Application Data

[63] Continuation of Ser. No. 607,863, Apr. 30, 1984, abandoned.

[51] Int. Cl.⁴ .......................... B22F 3/00; C21D 1/00; C22C 32/00
[52] U.S. Cl. .................... 428/547; 428/548; 428/550; 428/551; 428/553; 419/2; 419/7; 419/9; 419/10; 419/23; 419/27; 419/29; 252/12.2
[58] Field of Search ............... 428/546–550; 419/2, 7, 9, 10, 23–29; 308/5 R, 78.1, 241, DIG. 5, DIG. 7, DIG. 8, DIG. 9; 264/126, 127; 156/244.15; 427/191–195; 29/199.5; 252/12

[56] References Cited

U.S. PATENT DOCUMENTS

| | | | |
|---|---|---|---|
| 2,191,460 | 2/1940 | Fisher | 192/107 |
| 2,664,326 | 12/1953 | Kuzmick | 428/550 |
| 2,689,380 | 9/1954 | Tait | 18/59 |
| 2,691,814 | 10/1954 | Tait | 29/182.5 |
| 2,704,234 | 3/1955 | Love et al. | 308/237 |
| 2,731,360 | 1/1956 | Love | 117/49 |
| 2,747,261 | 5/1956 | Stosuy | 428/550 |
| 2,788,324 | 4/1957 | Alperton | 252/12.2 |
| 2,798,005 | 7/1957 | Love | 117/8 |
| 2,813,041 | 11/1957 | Mitchell et al. | 117/21 |
| 2,964,476 | 12/1960 | Coad | 252/26 |
| 2,972,549 | 2/1961 | Goldsmith | 117/4 |
| 2,995,462 | 8/1961 | Mitchell et al. | 117/8 |
| 3,081,196 | 3/1963 | MacDonald | 117/127 |
| 3,119,640 | 1/1964 | Laudig | 308/56 |
| 3,122,505 | 2/1964 | Rulon-Miller et al. | 252/12 |
| 3,132,418 | 5/1964 | Fulford | 29/471.1 |
| 3,142,559 | 7/1964 | Ruf et al. | 75/208 |
| 3,145,101 | 8/1964 | Franssen | 75/201 |
| 3,177,274 | 4/1965 | Pratt | 264/126 |
| 3,218,255 | 11/1965 | Pratt | 252/12 |
| 3,226,263 | 12/1965 | Oswin | 419/2 |
| 3,234,128 | 2/1966 | McLeish et al. | 252/12 |
| 3,234,311 | 2/1966 | Pratt et al. | 264/127 |

(List continued on next page.)

FOREIGN PATENT DOCUMENTS

| | | |
|---|---|---|
| 657085 | 9/1951 | United Kingdom . |
| 705005 | 3/1954 | United Kingdom . |
| 1481681 | 8/1977 | United Kingdom . |
| 125582 | 1/1972 | U.S.S.R. ............ 29/149.5 PM |

OTHER PUBLICATIONS

Preliminary Information about TEFLON—Fabrication of Sheeting and Tape by the HS-10 Process—E. I. du Pont de Nemours & Co. (10 pages) date unknown.
HS-10 Process (25 pages) date unknown.

*Primary Examiner*—Stephen C. Bentley
*Assistant Examiner*—T. J. Wallen
*Attorney, Agent, or Firm*—Robert F. Hess; Lawrence J. Shurupoff

[57] ABSTRACT

The present invention relates to a composite bearing material comprising three layers: (1) a metal backing, (2) a porous metal interlayer bonded to the metal backing which includes bronze or other copper alloy particles from two distinct particle size ranges and (3) a PTFE based composition intermixed with and overlying the porous metal interlayer. In accordance with the method of the present invention, the porous metal interlayer substantially comprises a relatively non-homogeneous mixture of particles from the two distinct particle size ranges, wherein a substantial portion of the relatively fine powder is segregated adjacent the metal backing. The present invention includes a significant thickness of the PTFE based composition applied to and remaining above the surface of the porous metal backing.

12 Claims, 4 Drawing Figures

U.S. PATENT DOCUMENTS

| | | | |
|---|---|---|---|
| 3,305,325 | 2/1967 | Le Brasse et al. | 29/182.3 |
| 3,342,667 | 9/1967 | Berlinghof, Jr. | 161/186 |
| 3,364,019 | 1/1968 | Houghtby et al. | 419/2 |
| 3,369,924 | 2/1968 | Duggins et al. | 117/65.2 |
| 3,376,183 | 4/1968 | Flynn et al. | 156/244 |
| 3,461,069 | 8/1969 | Waldhuter et al. | 252/12 |
| 3,518,186 | 6/1970 | Andrews et al. | 252/12 |
| 3,553,806 | 1/1971 | Turk et al. | 29/149.5 |
| 3,705,450 | 12/1972 | Morisaki | 29/182.3 |
| 3,729,292 | 4/1973 | Heck | 29/182.3 |
| 3,896,036 | 7/1975 | Cairns | 252/12 |
| 3,971,598 | 7/1976 | Rudge | 308/3 R |
| 4,000,982 | 1/1977 | Ueda | 29/182.3 |
| 4,012,539 | 3/1977 | Davies | 427/195 |
| 4,015,949 | 4/1977 | Baker et al. | 428/653 |
| 4,036,822 | 7/1977 | Patel et al. | 260/79 |
| 4,086,376 | 4/1978 | Davies | 427/185 |
| 4,096,075 | 6/1978 | Kakamura | 252/12 |
| 4,099,804 | 7/1978 | Baker et al. | 308/237 R |
| 4,101,712 | 7/1978 | Bomford et al. | 428/547 |
| 4,123,122 | 10/1978 | Gabrielson e al. | 308/238 |
| 4,172,622 | 10/1979 | Baker et al. | 308/237 R |
| 4,189,194 | 2/1980 | Davies | 308/35 |
| 4,193,645 | 3/1980 | Baker et al. | 308/23 |
| 4,200,541 | 4/1980 | Kinner et al. | 252/12.2 |
| 4,208,472 | 6/1980 | Cho et al. | 428/550 |
| 4,357,393 | 1/1982 | Tsuda et al. | 428/547 |
| 4,425,247 | 1/1984 | Bely et al. | 252/12 |

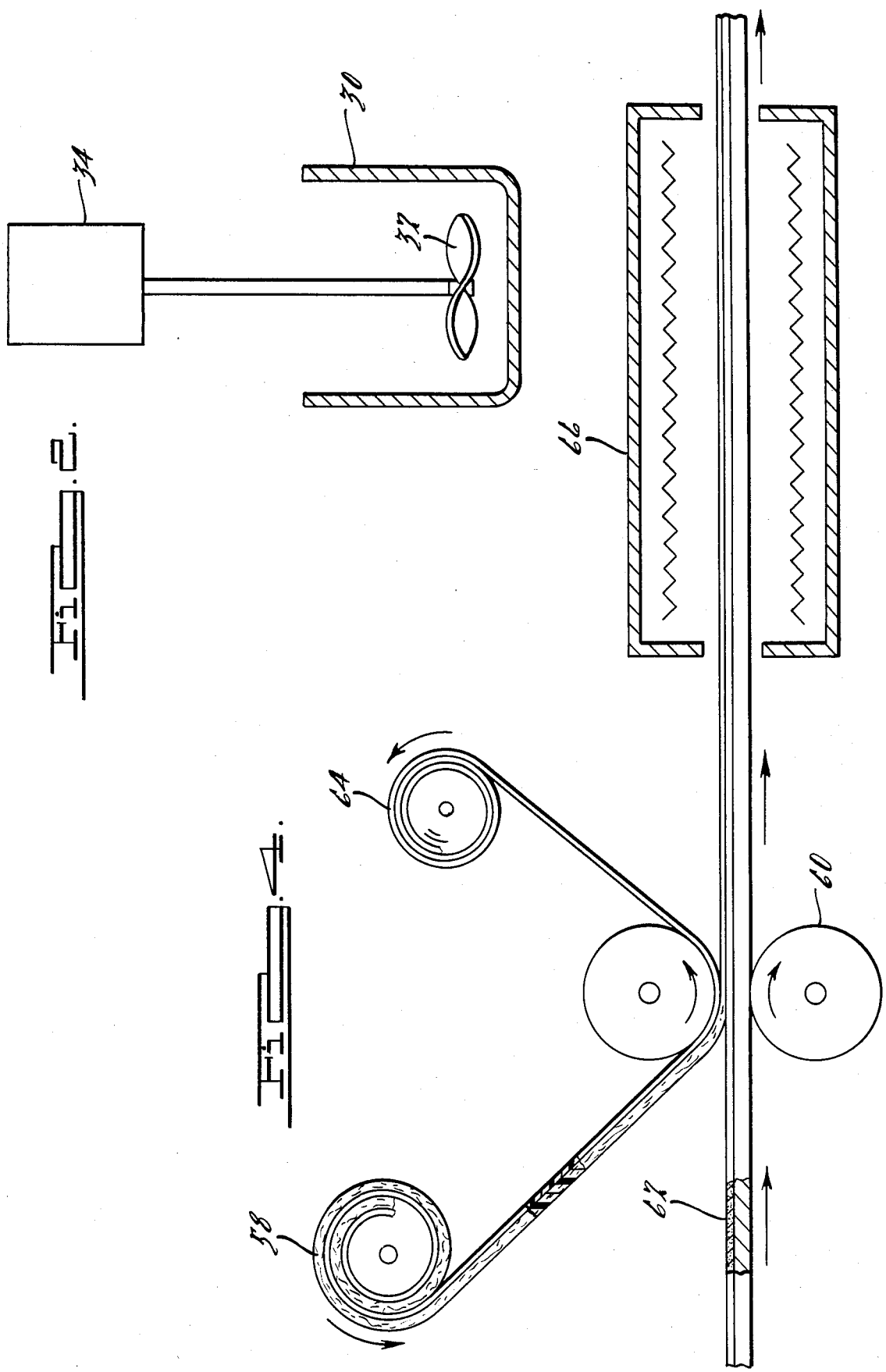

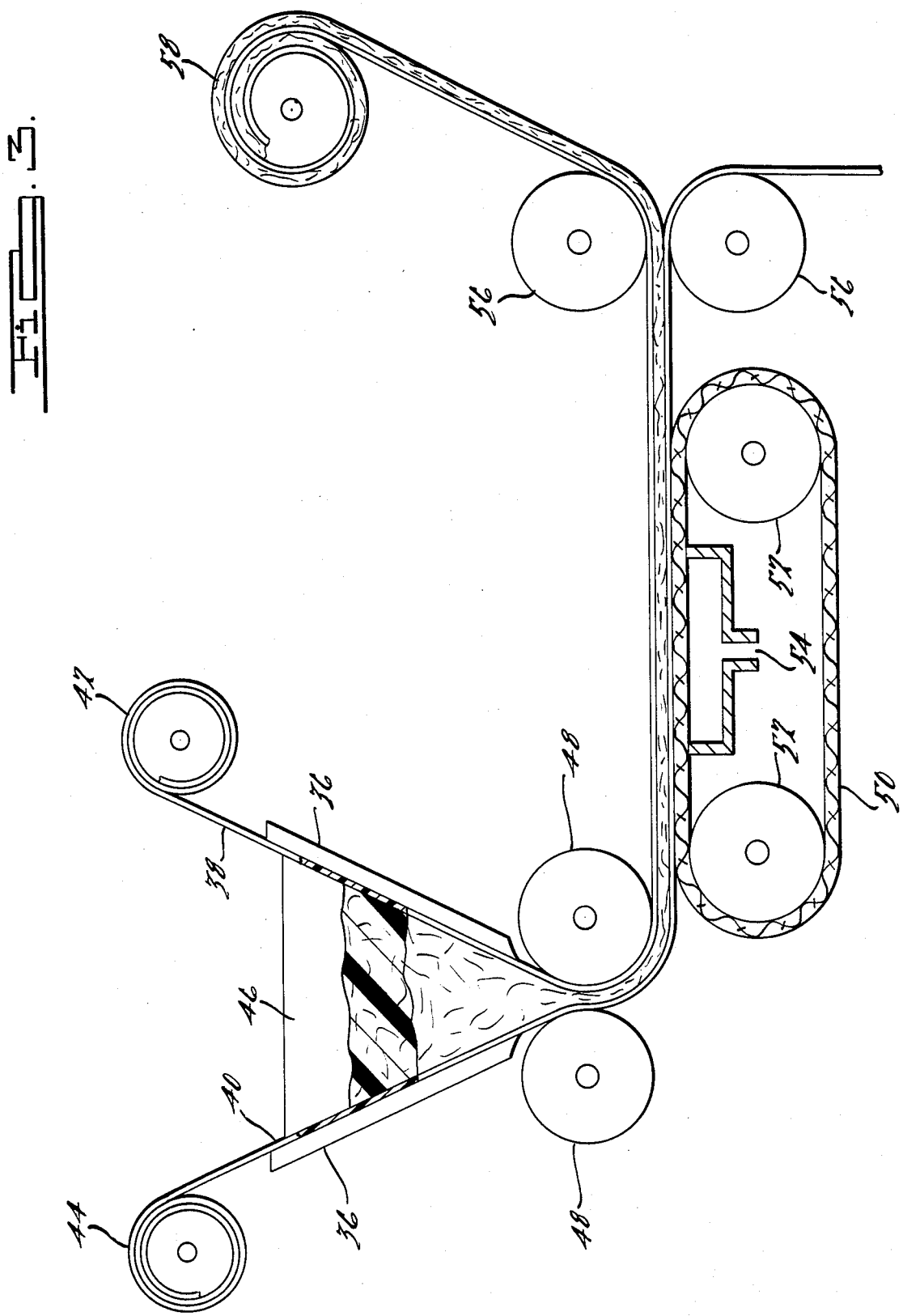

COMPOSITE BEARING MATERIAL WITH POLYMER FILLED METAL MATRIX INTERLAYER OF DISTINCT METAL PARTICLE SIZES AND METHOD OF MAKING SAME

This application is a continuation of application Ser. No. 607,863 filed Apr. 30, 1984, now abandoned.

CROSS-REFERENCE TO RELATED APPLICATION

The subject matter of this application is related to the subject matter disclosed in application Ser. No. 605,037, entitled "Method of Making a PTFE Based Tape Suitable for Impregnation into Porous Metal Matrix" now U.S. Pat. No. 4,615,854, with the inventors being noted as George C. Pratt and Michael C. Montpetit, filed Apr. 30, 1984, and assigned to the same assignee.

BACKGROUND OF THE INVENTION

This invention generally relates to an improved bearing material and related method, and more particularly to an improved composite bearing material which includeas polytetrafluoroethylene (PTFE).

Dry bearing materials, i.e., those which will operate as a bearing without the benefit of a lubricant applied to the bearing surface, are well known and may generally be considered to be of three main types: (1) homogeneous materials which may be molded or pressed and machined, any surface of which can be the bearing surface; (2) non-homogeneous materials generally taking the form of a backing material and a bearing layer, in which the bearing layer is a dry bearing composition; and (3) non-homogeneous materials generally taking the form of a backing material and an impregnated interlayer, and having a relatively thin surface layer over the interlayer, which surface layer generally cannot be machined without seriously adversely affecting the bearing capability of the material because of exposure of the interlayer. The present invention may generally be considered to be a composite material of the third general type referred to above, except that the surface layer is of significant thickness such that it can be machined without seriously affecting bearing capability.

Numerous situations arise wherein a bearing material is required to provide good wear resistance and low friction under conditions of moderate load and temperature while operating in a substantially dry or non-lubricated environment. A variety of composite bearing materials and plastic materials which incorporate desirable bearing characteristics and are of good wear resistance under the foregoing operating conditions have heretofore been used or proposed for use as bearing materials. Of the various dry bearing materials known, those based on polytetrafluoroethylene (PTFE) have perhaps received the most widespread use for this purpose. While dry bearing materials incorporating PTFE have been found to provide satisfactory performance under many different bearing operating conditions, an inherent disadvantage of such materials, when they are of the third general type described above, is, as noted above, the difficulty encountered in the finish machining thereof into bearings of the desired configuration and size. It is desirable therefore to retain the advantages of the third general type of bearing material, while at the same time providing the product with a degree of machinability. Among such advantages of this third general type of bearing material are: (1) a good bond between the lining and the backing (the porous interlayer being metallurgically bonded to the backing, and the polymer being keyed into the porous interlayer)—(This is particularly important in the case of PTFE which is difficult to bond to a backing. Composites of the second general type referred to above in which the lining is PTFE based tend to have a weak bond.); (2) dimensional stability (shared with the second general type referred to above when the dry bearing composition lining is thin); and (3) high thermal conductivity (shared with the second general type referred to above when the dry bearing composition lining is thin).

Dry bearing materials consisting of a metal backing and a porous metal interlayer impregnated with PTFE are well known. Generally, the PTFE is applied to the surface of the porous interlayer as a thick paste obtained by the coagulation of a dispersion of micron size PTFE particles in water. Sufficient water is retained in the paste to make it amenable to roll impregnation into the porous interlayer. Metallic or non-metallic fillers may be incorporated by mixing them in powder form with the PTFE before coagulation or at some stage during the preparation of the paste.

A composite bearing material of the third general type referred to above is normally produced as continuous strip, starting with a coil of steel, (which may be plated), to the surface of which bronze power is sintered to from a porous bronze layer. PTFE paste, with or without filler(s), is generaly applied to the surface of the porous bronze with a spoon. The strip then passes under a roller which spreads the paste over the surface of the bronze as a reasonably uniform layer. It then passes through a rolling mill which forces the paste into the porous bronze, leaving little or no paste above the bronze. The strip is then heated to a temperature in excess of 327° C. during which process the remaining water is driven off and the PTFE is sintered.

The method of applying the PTFE described above has several disadvantages, First, the paste is typicaly applied in discrete spoonfuls making it difficult to achieve a perfectly uniform distribution over the bronze surface. Second, the processs is typically labor intensive, since an operator with a spoon is often solely occupied with spooning the paste on to the strip. It has proved somewhat difficult to mechanize this operation.

There is a third disadvantage which applies to certain forms of the product. In a common form of the product, a single filler, in the form of lead powder, is incorporated into the PTFE. During roll impregnation of the PTFE/lead paste into the porous bronze layer, only a very thin layer of paste, usually less than about 30 microns ($1.2\times10^{-3}$ inches) thick is typically left above the surface of the bronze. The thickness of this surface layer is substantially unchanged during sintering of the PTFE. The surface layer has very low wear resistance, and in service the surface of the composite wears rapidly until the bronze surface is exposed in spots in the area of rubbing. Wear rate then falls to a low value. As wear proceeds, the proportion of bronze exposed in the area of rubbing gradually increases. When the proportion reaches approximately 10%, wear rate begins to increase and bronze is exposed at an increasing rate. Wear rate increases rapidly and the useful dry bearing life of the composite is near an end.

In other forms of the product, more than one filter is incorporated into the PTFE. If the fillers are appropriately chosen, the surface layer may be made to possess a high degree of wear resistance. A low wear rate is not dependent on the exposure of the impregnated bronze surface in the area of rubbing. In such forms of the product, it is an advantage to have a thick layer of PTFE above the bronze, since the dry bearing life of the commposite is thereby increased.

The third disadvantage referred to above of applying the PTFE as a paste by spoon to the bronze surface is that it has proved difficult by this process to leave a thick layer of PTFE above the bronze during impregnation. If the consistency of the paste is sufficiently soft for spooning and spreading evenly over the surface of the bronze, it is often so soft that some excess PTFE is often squeezed off the edges of the strip during impregnation and is not retained above the bronze as a thick surface layer. It has therefore proved difficult to achieve the increased dry bearing life theoretically made possible by the incorporation of appropriate fillers in the PTFE.

Development of a technique for creating a tape of PTFE incorporating controlled amounts of filler(s), suitable for roll impregnation into a porous metal matrix or interlayer, has been necessitated by the peculiar nature of PTFE. Although PTFE is classed by polymer chemists as a thermoplastic, it does not melt like other typical thermoplastics. At its transition temperature of 327° C., it changes to a rubber-like state generally unsuitable for melt processing. Tape of the type suitable for impregnation into a porous matrix cannot therefore generally be produced by extrusion like other thermoplastic polymers, such as nylon based materials, hexafluoropropylene based materials, or the like. The common method of producing sintered PTFE tape is to press and sinter a cylindrical block of the polymer, with or without the incorporation of fillers, and to skive off a tape from the surface of the cylinder with a knife. Unsintered PTFE tape can also be produced, and is commonly used for sealing threaded joints. Also, the use of a conveyor and compressing roller system including a belt made of a filtering or permeable material (such as felt), and the application of a vacuum to both the belt and to a PTFE based composition (which may include fillers) thereon, to produce PTFE based sheeting or tape is known. However, these forms of PTFE tape are not believed to be totally suitable for roll impregnation into porous metal sinter, since in some instances the PTFE is sufficiently strong even above its transition temperature to compact the porous metal interlayer instead of continously and fully impregnating into it, as is often desired. Successful impregnation may under certain circumstances be obtained, but may require the application of pressure at elevated temperature for times often impracticable for a reasonable roll impregnation strip process required to operate at reasonably economic speeds.

It is accordingly a principal object of the present invention to provide a improved composite bearing material which posseses excellent dry bearing characteristics and has good wear resistance in the presence of limited or no lubrication when operating under moderate load and temperature conditions.

Another object of the present invention is to provide an improved composite bearing material which incorporates controlled proportions of selected filler materials which enhance the dry bearing characteristics of the material such that improved wear resistance of the material is obtained.

Still another object of the present invention is to provide an improved composite bearing material having a surface layer of significant thickness which may be machined without seriously affecting bearing capability.

SUMMARY OF THE INVENTION

The foregoing objects and other advatages of the present invention are achieved by providing a composite bearing material comprising three layers: (1) a metal backing, which will normally be a low carbon steel and which may be plated such as with nickel plating or the like, (2) a porous metal interlayer, which may comprise bronze or other copper alloys, on said metal backing, and (3) a PTFE based composition formulated to have good wear resistance. The pores in the interlayer are substantially filled with the PTFE based composition, which is applied in such a way as to leave the desired thickness of PTFE based composition above the porous metal interlayer to form a surface layer. The main function of the interlayer is to key the PTFE based composition and surface layer to the metal backing. In accordance with the present invention, the power used to form the porous metal interlayer is substantially comprised of particles from two distinct particle size ranges obtained by blending relatively fine powder particles with relatively coarse powder paticles. In accordance with the method of the present invention, in forming a porous metal interlayer on a metal backing, with the porous metal interlayer being suitable for impregnation with a PTFE based composition to form a composite bearing material, the porous metal interlayer is appilied to the metal backing as a relatively homogeneous mixture of metal powder substantially comprising particles from the two distinct particle size ranges, namely, the relatively fine powder range and the relatively coarse powder range. During and after being applied to the metal backing and prior to the completion of sintering, a substantial portion of the relatively fine powder from the relatively homogeneous mixture of metal powder is segregated adjacent the metal backing so that a relatively non-homogeneous mixture of metal powder is formed on the metal backing. The two particle size ranges are selected so as to provide for such segregation. In addition, the PTFE based composition which is impregnated into the porous metal interlayer in accordance with the present invention comprises from about 2% to about 10% by volume of at least one one material selected from the group consisting of tin bronze and other copper alloys, as well as mixtures thereof; from about 5% to about 30% by volume of at least one material selected from the group consisting of metallic lead, metallic cadmium, an oxide of lead, and an oxide of cadmium, as well as mixtures thereof; from about 5% to about 30% by volume of at least one material selected from the group consisting of natural graphite and artificial graphite, as well as mixtures thereof; with the remainder comprising polytetrafluoroethylene. As will be described further hereinbelow, the present invention enables a significant thickness of the PTFE based composition to be applied and remain above the surface of the porous metal backing. The present invention is especially suited to provide low friction and a high degree of dry wear resistance. The low friction derives from the PTFE matrix, while the good wear resistance derives from the combination of fillers incorporated into the PTFE.

Additional benefits and advantages of the present invention will become apparent upon a reading of the detailed description of the preferred embodiment taken in conjunction with the accompanying examples.

BRIEF DESCRIPTION OF THE DRAWINGS

FIG. 2 is a schematic representation of a mixing apparatus used in connection with a preferred method of makind the product of the present invention;

FIG. 3 is a schematic representation of a hopper, roller system, and water-removal system also used in connection with a preferred method of making the product of the present invention; and FIG. 4 is a schematic representation of a further roller system and oven system also used in connection with a preferred method of making the product of the present invention.

DESCRIPTION OF THE PREFERRED EMBODIMENT

Figure 1:
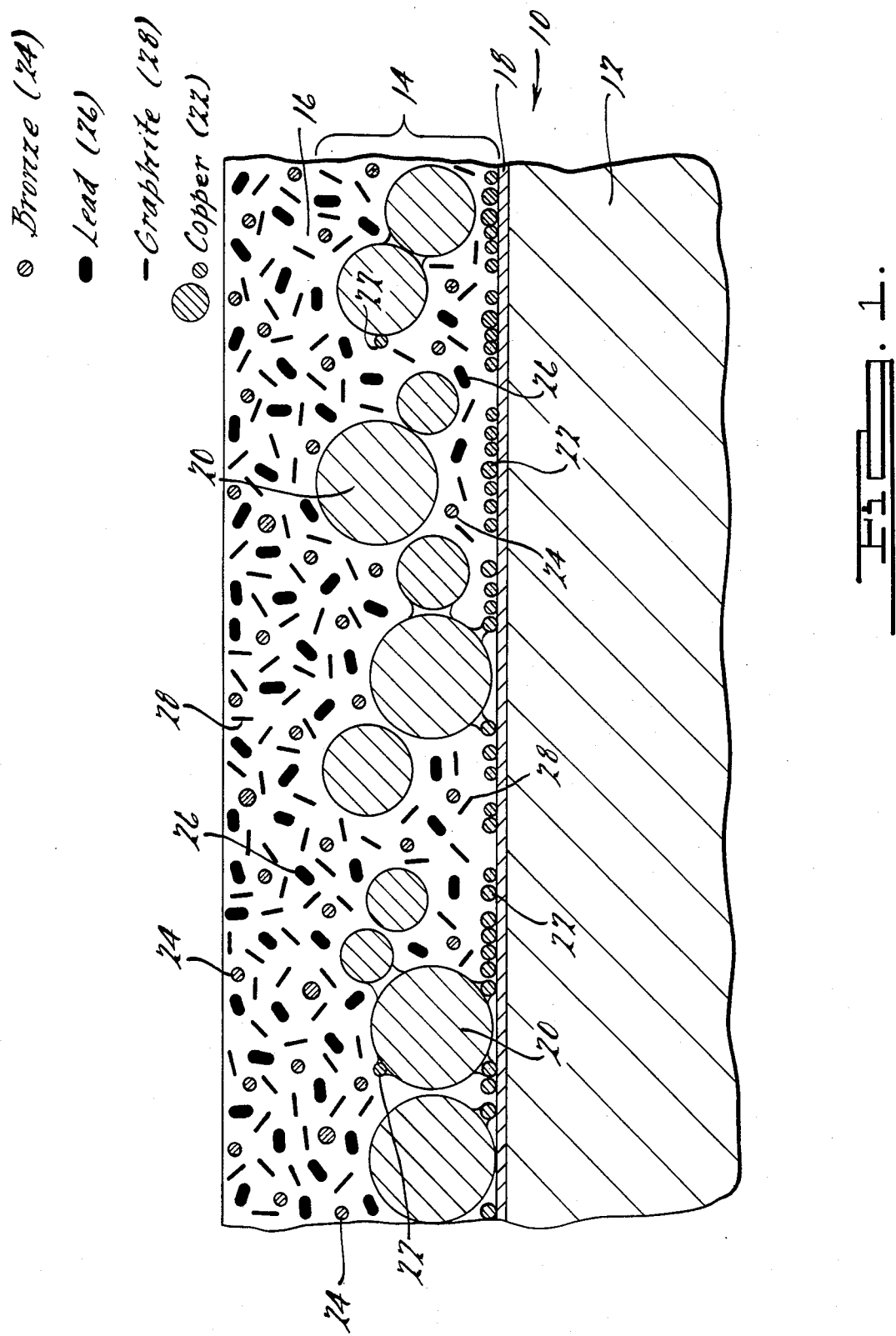
FIG. 1 is a schematic representation of a cross-section of bearing material made in accordance with the present invention.

Referring now to the drawings wherein the showings are for the purpose of illustrating a preferred embodiment of the present invention and are not for the purpose of limiting the invention, FIG. 1 shows a schematic cross-sectional view of bearing material 10. The bearing material 10 generally comprises three layers: (1) a metal backing 12, (2) a porous metal interlayer 14, and (3) a PTFE based composition 16. The metal backing 12 will normally be low carbon steel, although other suitable backing materials should also be useable. In addition, in order to enhance adhesion of the porous metal interlayer 14 to the metal backing 12, the metal backing 12 may be plated with a layer 18 of nickel plating or other conventional plating materials.

The porous metal interlayer 14 may consist of bronze or other copper alloys such as tin bronze or leaded bronze. The porous metal interlayer or porous metal matrix is produced by spreading the copper alloy powder onto the metal backing and heating in a conventional manner in a non-oxidizing atmosphere to a temperature at which sintering of the powder particles to one another and to the metal backing takes place. For example, a temperature of 850 degrees C. in a nitrogen-hydrogen atmosphere is suitable for sintering tin bronze particles. The powder used to form the porous metal interlayer consists of two distinct size ranges of particles obtained by blending relatively fine powder particles with relatively coarse powder particles to form a relatively homogeneous mixture. During and after spreading of the powder layer and before the completion of sintering, a substantial portion of the relatively fine particles segregate down to the metal backing surface where they promote formation of the bond between the interlayer and the metal backing. Hence a relatively non-homogeneous mixture of metal powder is formed on the metal backing. The surface activity of the fine particles during sintering is greater than that of the coarse particles, and hence, a stronger bond is established in a given time than if the fine particles were not present. Segregation of the fine particles to the steel surface leaves an open structure substantially of coarse particles in the upper surface of the interlayer ideally suited to impregnation with the PTFE based composition. Such segregation is represented schematically in FIG. 1 where the large particles 20 represent coarse bronze powder or the like and the small particles 22 represent fine bronze powder or the like. The thickness of the porous metal interlayer after sintering is preferably from about 0.25 mm (0.010 inches) to about 0.40 mm (0.016 inches). It has been found that relatively coarse powders of the order of from about −60 to about +150 mesh (Tyler units or the like), preferably of the order of about −60 mesh about +100 mesh, mixed with relatively fine powders of the order of about −300 mesh give good results. (A minus sign prior to a mesh designation indicates that the powder will go through the stated mesh, while a plus sign indicates that the powder will be retained on the mesh. For example, −300 indicates particles of 300 mesh size and smaller.) In addition, it has been found that the addition of wax during mixing of the two powder fractions prior to transfer of the mixed bronze powders to the hopper used to hold and distribute the powder on the metal backing, prevents premature segregation of the two size fractions of powder without affecting spreadability. The addition of about 0.5% by weight of "Acrawax" to the bronze powder by tumbling has been found to give satisfactory results. "Acrawax" is a synthetic amide wax manufactured by Glyco Chemical Corporation, and chemically comprises ethylene di-stearamide. In addition, zinc stearate may also be usable. This wax material volatilizes during sintering.

With regard to the PTFE based composition, it has been found possible to optimize wear resistance of the PTFE composition by the incorporation of three distinct types of filler materials. The fillers are preferably: (1) tin bronze, (2) metallic lead, and (3) natural graphite. (These are represented schematically in FIG. 1 as particles 24, 26, and 28 respectively.) Other copper alloys may be substituted for the tin bronze; metallic cadmium, an oxide of lead, or an oxide of cadmium may be substituted for the lead; and artificial graphite may be substituted for the natural graphite. However, some loss of dry wear resistace will result from such substitutions. Mixtures of each of these fillers are also believed to be usable. The filler component which is at least one material selected from the group consisting of tin bronze and other copper alloys, as well as mixtures thereof, should preferably be about −300 mesh powder and should generally be present in the range of from about 2% to about 10% by volume of te PTFE based composition, with from about 4% to about 6% by volume being preferred, and with about 5% by volume providing optimum results. The filler component which is at least one material selected from the group consisting of metallic lead, metallic cadmium, an oxide of lead, and an oxide of cadmium, as well as mixtures thereof, should preferably be about −200 mesh powder and should generally be present in the range of from about 5% to about 30% by volume of the PTFE based composition, with from about 15% to about 30% by volume being preferred, and with about 20% by volume providing optimum results. The filler component which is at least one material selected from the group consisting of natural graphite and artificial graphite, as well as mixture thereof, should preferably be about −325 mesh powder and should generally be present in the range of from about 5% to about 30% by volume of the PTFE based composition, with from about 10% to about 25% by volume being preferred, and with about 10% by volume providing optimum results. PTFE makes up the remainder of the lining composition.

In order to further describe the illustrate the present invention, the following examples are provided. It will be understood that these examples are provided for illustrative purposes and are not intended to be limiting of the scope of the invention as herein described and as set forth in the subjoined claims.

In Table I hereinbelow, the effect of incorporating various proportions of relatively fine bronze powder (−300 mesh in this example) into relatively coarse bronze powder (−60 to +100 mesh in this example) on both the bond strength to the steel substrate and on the porosity of the bronze layer is shown. Needless to say, the results given are after sintering. As shown in this table, the optimum percentage by weight of about −300 mesh powder giving a high level of both bond and porosity is about 20%. In general, the relatively fine powder preferably comprises from about 5% to about 30% by weight of the total powder used to produce the porous metal interlayer. Percent bond was metallographically measured by conventional techniques by determining the amount of bronze in contact with the steel surface, which was nickel plated. Percent porosity was methallographically measured by conventional techniques using an image analyzer.

TABLE I

| % by weight fine powder | % bond to the steel | % porosity in the sintered bronze layer |
| --- | --- | --- |
| 0 | 23.6 | 47.3 |
| 10 | 41.4 | 42.6 |
| 20 | 87.3 | 43.8 |
| 30 | 83.7 | 32.8 |
| 40 | 98.8 | 19.6 |
| 50 | 94.5 | 20.8 |

Table II hereinbelow presents data on the wear of PTFE based compositions made in accordance with the present invention after rubbing against a 2.125 inch diameter steel shaft. A rotational speed of 980 rpm, a load of 11 lbs., and a test duration of 16 hours were used. (The PTFE based compositions were in sintered block form for these tests.)

TABLE II

| Composition % by Volume Filler -Remainder PTFE | | | |
| --- | --- | --- | --- |
| Tin Bronze (−300) | Lead (−200) | Natural Graphite (−325) | Wear × 10$^{-3}$ Cubic Inches |
| 2.5 | 10 | 0 | 0.17 |
| 2.5 | 10 | 10 | 0.27 |
| 2.5 | 10 | 20 | 0.20 |
| 5 | 10 | 0 | 0.35 |
| 5 | 10 | 10 | 0.22 |
| 5 | 10 | 20 | 0.16 |
| 10 | 10 | 0 | 0.57 |
| 10 | 10 | 10 | 0.55 |
| 10 | 10 | 20 | 0.40 |
| 2.5 | 20 | 0 | 0.13 |
| 2.5 | 20 | 10 | 0.21 |
| 2.5 | 20 | 20 | 0.19 |
| 5 | 20 | 0 | 0.13 |
| 5 | 20 | 10 | 0.10* |
| 5 | 20 | 20 | 0.28 |
| 10 | 20 | 0 | 0.21 |
| 10 | 20 | 10 | 0.20 |
| 10 | 20 | 20 | 0.32 |

*best result

The PTFE based compositions used with the present invention may conveniently be applied to the porous metal interlayer using conventional methods such as in the form of a paste incorporating a suitable proportion of a liquid such as water with the PTFE and fillers. The paste is impregnated into the porosity of the metal interlayer for instance by conventional rolling techniques, the rolling conditions being chosen such as to leave a layer from about 0.05 mm (0.002 inches) to about 0.5 mm (0.020 inches) thick above the surface of the interlayer. The PTFE based composition is then sintered in a conventional manner at a temperature above 327 degrees C., and preferably below 400 degrees C., during which process the liquid evaporates and a firm bearing lining is created.

In addition to the above-described paste technique, a preferred method of applying the PTFE based composition of the present invention is claimed in application Ser. No. 605,037, entitled "Method of Making a PTFE Based Tape Suitable for Impregnation into a Porous Metal Matrix", with the inventors being noted as George C. Pratt and Michael C. Montpetit, filed on the same day as this application, and assigned to the same assignee, now U.S. Pat. No. 4,615,854. That application, which is hereby incorporated by reference herein, relates to a process for applying PTFE to the surface of metal backed porous bronze strip or the like which is believed to overcome some of the disadvantages of conventional rolling techniques described hereinabove. The process permits the application of a relatively uniform layer of PTFE; it is not labor intensive; and full impregnation of the porous metal interlayer may be obtained while leaving a relatively thick layer of PTFE above the porous metal interlayer. The process is primarily intended for applying PTFE incorporating more than one filler combining to endow the surface layer with a high degree of dry wear resistance. The process is however applicable also to PTFE with less than two fillers.

The process generally consists of the following stages: mixing the fillers into an aqueous dispersion of PTFE and adding a water thickener and coagulant, transferring the resultant paste (having a consistency reminiscent of porridge) to a machine in which it is sandwiched between a continuously moving band of supporting material and a band of high wet strength filter paper, compacting or compressing the sandwich and removing excess water by rolling, transferring the sandwich to a moving belt comprising a gauze-like material, removing some of the remaining water through the filter paper and the gauze belt by suction, further compacting or compressing the sandwich, removing the layer of filter paper, coiling the supporting material with the PTFE based material adhering to one side, and roll impregnating the PTFE based material into a metal backed porous metal interlayer and peeling off the layer of supporting material.

The process is illustrated in FIGS. 2, 3, and 4, and the stages in the preferred embodiment are as follows. For example, 810 ml (or 990 grams) of an aqueous dispersion of PTFE (E. I. DuPont de Nemours & Co., "DuPont", T35) containing 33% by weight PTFE are poured into a container 30 and stirred by a paddle 32 driven by an electric motor 34. 520 grams of −200 mesh metallic lead powder, 50 grams of −325 mesh natural graphite powder (technical grade), and 100 grams of −300 mesh in tin bronze powder are added to the PTFE dispersion while stirring. (The above amounts of lead, graphite, and tin bronze correspond to the optimum amounts referred to above, namely about 20%, 10%, and 5% by volume, respectively, of the final PTFE based cmposition.) 33 grams of a latex-based polymeric water thickener (Rohm and Hass TT615), 50 ml of ammonium hydroxide (28–30% NH$_3$, normality of 15, reagent grade), and 100 ml of a 250 gram/liter solution of aluminum nitrate (reagent grade) are added, and stirring is continued until the mixture attains the consistency of a thick paste. The aluminum nitrate function as as coagulant, while the ammonium hydroxide appears to act as a catalyst.

Referring now to FIG. 3, the paste is transferred to a hopper 36, one wall of which supports a moving band of supporting material 38 (such as Mylar$^R$ biaxially oriented polyethylene terephthalate made by DuPont), and another wall of which supports a moving band of high wet strength filter paper 40 (such as Eaton Dyteman Grade 909/20). The supporting material and the filter paper are fed from rolls above the hopper 42 and 44, respectively. The hopper has adjustable side walls 46.

The hopper is sited immediately above a pair of rolls 48 and the paste is caried into the roll gap sandwiched between the supporting material and the filter paper. The PTFE based material is compressed to a thickness of about 1.25 mm (0.050 inches). The sandwich is then carried on a gauze belt 50 (such as semi-rigid polyester sieve-type gauze available from Sagent-Welch as polyester monofilament sieve cloth S74616P), which is moved b rollers 52, across the inlet to a vacuum pump 54 which removes some of the water fom the PTFE based material by suction (15 inches of mercury (dynamic vacuum) drawn over a 14 square inch area in this example) through the filter paper and the gauze. The sandwich then passes between a second pair of rolls 56 where the PTFE based material is compacted to a final thickness of about 0.25–0.50 mm (0.010–0.020 inches, about 0.015 inches is preferred). The filter paper is then peeled from the PTFE based material, and the supporting material with a tape of PTFE base material adhering to one side is coiled into a roll 58. The water content of the PTFE based tape is approximately 20%.

Referring now to FIG. 4, the coil 58 of PTFE based tape interleaved with supporting material from the preceding step is then mounted on the input side of a roll impregnating mill 60. As a steel backed porous bronze strip 62 (the bronze interlayer is about 0.30 mm thick) moves through the mill, (the steel is nickel-plated in a preferred embodiment), the interleaved tape is fed into the roll gap, where the PTFE based material is forced into the pores of the bronze. The supporting material is peeled off the surfaace of the PTFE based material and coiled into a roll 64. The mill gap is controlled so as to leave the desired surface layer of PTFE based material, approximately 0.15 mm (0.006 inches) thick above the bronze. The composite strip then passes through an oven 66 in which the PTFE based material is sintered in a conventional manner at a temperature of 350° C. (One skilled in the art will recognize that the various apparatus of FIGS. 3 and 4 could be combined to make a continuous operation without an intermediate roll-up step at 58.) Also, materials other than the specific chemicals and/or other materials referred to in connection with the above tape process may also be usable.

In the tape process described above, the extent to which the PTFE based material is "mechanically worked" is kept to a minimum and a small proportion of liquid, water in the above example, is retained in the PTFE based tape. The tape is weak and uses the liquid as a lubricant, and for this reason has to be carried into the impregnating mill on its supporting material backing. Because of its lack of strength, however, it can be forced into the pores of the porous metal interlayer without compacting that layer and closing up the pores.

Bearing components such as bushings and thrust washers can then be formed from the composite bearing material by conventional techniques. Such components will have excellent wear resistance in dry bearing applications, and may also be used with advantage in certain lubricated bearing applications.

While it will be apparent that the invention herein disclosed is well calculated to achieve the benefits and advantages as hereinabove set forth, it will be appreciated that the invention is susceptible to modification, variation, and change without departing from the spirit thereof.

What is claimed is:

1. A composite bearing material suitable for both dry and lubricated bearing applications comprising:
   (a) a metal backing;
   (b) a porous metal interlayer on said metal backing, said porous metal interlayer consisting essentially of a relatively non-homogeneous mixture of particles form two distinct particle size ranges including a relatively fine powder range of about −300 mesh and less and a relatively coarse powder range form about −60 to +150 mesh, said relatively fine powder range comprising from about 5% to about 30% by weight of the total powder constituting said porous metal interlayer and wherein a substantial portion of said relatively fine powder is segregated from the particles in said coarse powder range to the innermost surface of said porous metal interlayer adjacent said metal backing and bonded to said metal backing and certain of said particles within said relatively coarse range, said particles from said relatively coarse range being bonded to one another and forming a open structure of numerous pores throughout at least the outermost surface of said porous metal interlayer; and
   (c) a polytetrafluoroethylene based composition substantially filling the pores of said porous metal interlayer and forming a surface layer on the bearing material, said polytetrafluoroethylene based composition comprising from about 2% to about 10% by volume of at least one material selected from the group consisting of tin bronze and other copper alloys, as well as mixtures thereof; from about 5% to about 30% by volume of at least one material selected from the group consisting of metallic lead, metallic cadmium, an oxide of lead, and an oxide of cadmium, as well as mixtures thereof; from about 5% to about 30% by volume of at least one material selected from the group consisting of natural graphite and artifical graphite, as well as mixtures thereof; and the remainder comprising polytetrafluoroethylene.

2. A composite bearing material as defined in claim 1 in which said metal backing comprises steel.

3. A composite bearing material as defined in claim 1 in which said metal backing includes a layer of plating thereon.

4. A composite bearing material as defined in claim 3 in which said plating comprises nickel plating.

5. A composite bearing material as defined as in claim 1 in which said porous metal interlayer comprises bronze or other copper alloys.

6. A composite bearing material as defined in claim 1 in which said porous metal interlayer comprises tin bronze or leaded bronze.

7. A composite bearing material as defined in claim 1 in which said relatively fine powder range comprises about 20% by weight of the powder used to produce said porous metal interlayer.

8. A composite bearing material as defined in claim 1 in which said polytetrafluoroethylene based composition comprises from about 4% to about 6% by volume of at least one material selected from the group consisting of tin bronze and other copper alloys, as well as mixtures thereof; from about 15% to about 3% by volume of at least one material selected from the group consisting of metallic lead, metallic cadmium, an oxide of lead, and an oxide of cadmium, as well as mixtures thereof; from about 10% to about 25% by volume of at least one material selected from the group consisting of natural graphite and artifical graphite, as well as mixtures thereof; and the remainder comprises polytetrafluoroethylene.

9. A composite bearing material as defined in claim 1 in which said polytetrafluoroethylene based composition comprises about 5% by volume of at least one material selected from the group consisting of tin bronze and other copper alloys, as well as mixtures thereof; about 20% by volume of at least one material selected from the group consisting of metallic lead, metallic cadmium, an oxide of lead, and an oxide of cadmium, as well as mixtures thereof; about 10% by volume of at least one material selected from the group consisting of natural graphite and artificial graphite, as well as mixtures thereof; and the remainder comprises polytetrafluoroethylene.

10. A composite bearing material as defined in claim 1 in which said polytetrafluoroethylene based composition has a thickness above the porous metal interlayer of from about 0.05 mm to about 0.5 mm.

11. A composite bearing material as defined in claim 1 in which said porous metal interlayer has a thickness of from about 0.25 mm to about 0.40 mm.

12. A method of making a composite bearing material including the steps of:
    forming a porous metal interlayer on a metal backing by applying to said metal backing a relatively homogeneous mixture of metal powder substantially comprising particles from two distinct particle size ranges, namely a relatively fine powder range and a relatively coarse powder range,
    selecting said two particle size ranges to provide for segregation of a substantial portion of said relatively fine powder from said relatively homogeneous mixture of metal powder such that the relatively fine powder shall consist essentially of particles of −300 mesh size and less, and said relatively coarse powder shall consist essentially of particles ranging from about −60 meash size to about +150 mesh size, said relatively fine powder range comprising from about 5% to about 30% by weight of the total powder used to produce said porous metal interlayer,
    spreading said relatively homogeneous mixture of metal powder onto said metal backing and thereby causing a substantial portion of said relatively fine powder to segregate to the innermost surface of said porous metal interlayer adjacent said metal backing prior to the completion of sintering to form a relatively non-homogeneous mixture of metal powder on said metal backing,
    sintering said metal powder on said metal backing,
    impregnating and substantially completely filling said porous metal interlayer with a polytetrafluoroethylene based composition, and
    thereafter sintering said filled porous metal interlayer at a temperature of at least about 350° C.

* * * * *

UNITED STATES PATENT AND TRADEMARK OFFICE
CERTIFICATE OF CORRECTION

PATENT NO. : 4,732,818

DATED : March 22, 1988

INVENTOR(S) : George C. Pratt, Michael C. Montpetit and Michael D. Lytwynec

It is certified that error appears in the above-identified patent and that said Letters Patent is hereby corrected as shown below:

Column 1, line 24, "includeas" should read "includes".

Column 6, line 29, "filer" should read "filler".

Column 6, line 37, "resistace" should read "resistance".

Column 6, line 44, "te" should read "the".

Column 8, line 66, "Hass" should read "Haas".

Column 9, line 22, "Sagent" should read "Sargent".

Column 9, line 24, "b" should read "by".

Column 9, line 25, "fom" should read "from".

Column 9, line 46, "surfaace" should read "surface".

Column 10, line 20 (Claim 1), "form" should read "from".

Column 10, line 22 (Claim 1), "form" should read "from".

Column 11, line 9 (Claim 8), "3%" should read "30%".

Column 12, line 19 (Claim 12), "meash" should read "mesh".

Signed and Sealed this

Thirtieth Day of August, 1988

*Attest:*

DONALD J. QUIGG

*Attesting Officer*  *Commissioner of Patents and Trademarks*